United States Patent
Douady et al.

(10) Patent No.: US 7,769,027 B2
(45) Date of Patent: Aug. 3, 2010

(54) METHOD AND DEVICE FOR MANAGING PRIORITY DURING THE TRANSMISSION OF A MESSAGE

(75) Inventors: Cesar Douady, Orsay (FR); Philippe Boucard, Le Chesnay (FR)

(73) Assignee: Arteris, Guyancourt (FR)

( * ) Notice: Subject to any disclaimer, the term of this patent is extended or adjusted under 35 U.S.C. 154(b) by 1311 days.

(21) Appl. No.: 10/915,950

(22) Filed: Aug. 11, 2004

(65) Prior Publication Data
US 2005/0117589 A1      Jun. 2, 2005

(30) Foreign Application Priority Data
Aug. 13, 2003    (FR) ................... 03 09918

(51) Int. Cl.
*H04L 12/56* (2006.01)
(52) U.S. Cl. ............... 370/395.42; 370/413; 709/234
(58) Field of Classification Search .......... 370/351, 370/386–389, 395.1, 395.4, 395.41, 395.42, 370/395.43, 230, 235, 363, 391, 401, 412–418, 370/220, 254, 402; 709/233–234
See application file for complete search history.

(56) References Cited

U.S. PATENT DOCUMENTS

| | | | |
|---|---|---|---|
| 5,651,002 A | 7/1997 | Van Seters et al. | |
| 5,999,534 A * | 12/1999 | Kim | 370/395.42 |
| 6,144,669 A * | 11/2000 | Williams et al. | 370/401 |
| 6,400,720 B1 | 6/2002 | Ovadia et al. | |
| 6,411,684 B1 * | 6/2002 | Cohn et al. | 379/88.14 |
| 6,570,883 B1 * | 5/2003 | Wong | 370/412 |
| 6,704,321 B1 * | 3/2004 | Kamiya | 370/412 |
| 6,717,951 B2 * | 4/2004 | Stanton et al. | 370/418 |

(Continued)

FOREIGN PATENT DOCUMENTS

EP          1061695          12/2000

(Continued)

OTHER PUBLICATIONS

Guerrier et al., "A Generic Architecture for On-Chip Packet-Switched Interconnections", Mar. 2000, IEEE, pp. 250-254.

(Continued)

*Primary Examiner*—Kwang B Yao
*Assistant Examiner*—Jeffrey M Rutkowski
(74) *Attorney, Agent, or Firm*—Fish & Richardson P.C.

(57) ABSTRACT

Method of managing priority during the transmission of a message, in an interconnections network comprising at least one transmission agent which comprises at least one input and at least one output, each input comprising a means of storage organized as a queue of messages. A message priority is assigned during the creation of the message, and a queue priority equal to the maximum of the priorities of the messages of the queue is assigned to at least one queue of messages of an input. A link priority is assigned to a link linking an output of a first transmission agent to an input of a second transmission agent, equal to the maximum of the priorities of the queues of messages of the inputs of said first agent comprising a first message destined for that output of said first agent which is coupled to said link, and the priority of the link is transmitted to that input of said second agent which is coupled to the link.

13 Claims, 3 Drawing Sheets

U.S. PATENT DOCUMENTS

| | | | | |
|---|---|---|---|---|
| 7,606,155 | B2* | 10/2009 | Higashida | 370/235 |
| 2002/0085582 | A1 | 7/2002 | Kim | |
| 2002/0129378 | A1* | 9/2002 | Cloonan et al. | 725/111 |
| 2002/0196785 | A1* | 12/2002 | Connor | 370/392 |
| 2003/0076834 | A1* | 4/2003 | Davis | 370/395.1 |
| 2004/0017820 | A1 | 1/2004 | Garinger et al. | |
| 2004/0114607 | A1* | 6/2004 | Shay et al. | 370/395.42 |
| 2004/0228363 | A1* | 11/2004 | Adamczyk et al. | 370/468 |
| 2006/0285488 | A1* | 12/2006 | Honda | 370/220 |

FOREIGN PATENT DOCUMENTS

| | | |
|---|---|---|
| EP | 1182819 | 2/2002 |
| EP | 1206077 | 5/2002 |

OTHER PUBLICATIONS

Rosenberg et al., "SIP: Session Initiation Protocol", Feb., 2002, *Internet Engineering Task Force*, 192 pages.

Rapport de Recherche Preliminaire for FR 0308225, Date d'achevement de la recherche Jul. 5, 2004, (1 page).

Rapport de Recherche Preliminaire for FR 0308905, date d'achevement de la recherché Dec. 23, 2003 (1 page).

Tamir et al., "High-performance multi-queue buffers for VLSI communication switches", Computer Architecture, 1988, Conference Proceedings, 15th Annual International Symposium, May 30, 1988-Jun. 2, 1988, pp. 343-354, XP002266011.

Kermani et al., "Virtual Cut-Through: A New Computer Communication Switching Technique", Computer Networks, North Holland, Amsterdam, NL, vol. 3, 1979, pp. 267-286, XP00814463, ISSN: 0376-5075.

http://www.cs.bu.edu/~best/crs/cs551/lectures/lecture-15.html, "Message Passing Architectures", Lesson 15, A. Bestavros, Nov. 1, 1994 (3 pages).

http://www.proj-mission.org/EE660/Gautam7.4.pdf "Message Passing Mechanisms" (3 pages).

Rapport de Recherche Preliminaire for French Application No. FR 0309918 date d'achevement de la recherché Apr. 6, 2004 (3 pages).

Yamaguchi et al. "CODA-R: a reconfigurable testbed for real-time parallel computation", Real-Time Computing Systems and Applications, 1997, Proceedings, Fourth International Workshop on Taipei, Taiwan Oct. 27-29, 1997, Los Alamitos, CA, USA, IEEE Comput. Soc., U.S., Oct. 27, 1997, pp. 252-259, XP010251835, ISBN: 0-8186-8073-3.

Toda et al., "A priority forwarding scheme for real-time multistage interconnection networks", Proceedings of the Real Time Systems Symposium, Phoenix, Dec. 2-4, 1992, Los Alamitos, IEEE Comp. Soc. Press, U.S. Dec. 2, 1992, pp. 208-217, XP010031283, ISBN: 0-8186-3195-3.

Toda et al., "Implementation of a priority forwarding router chip for real-time interconnection networks", Parallel and Distributed Real-Time Systems, 1994, Proceedings of the Second Workshop on Cancun, Mexico, Apr. 28-29, 1994, Los Alamitos, CA, USA, IEEE Comput. Soc. Apr. 28, 1994, pp. 166-175, XP010125212, ISBN: 0-8186-6420-7.

Rapport de Recherche Preliminaire for FR 0400554, date d'achevement de la recherché Sep. 29, 2004 (3 pages).

Rapport de Recherche Preliminaire for FR 0402149, date d'achevement de la recherché Sep. 22, 2004 (3 pages).

Benini et al., "Networks on Chips: A New SoC Paradigm", Computer, IEEE Computer Society, Long Beach, CA, US, vol. 35, No. 1, Jan. 2002, pp. 70-78, XP001091890, ISSN: 0018-9162.

Liu et al., "Error control schemes for networks: An overview", Mobile Networks and Applications, vol. 2, No. 2, Oct. 1997, pp. 167-182, XP002296032, Kluwer Academic Publishers, Hingham, MA, USA.

Rapport de Recherche Preliminaire for French Application No. FR 0313298 date d'achevement de la recherché Jul. 20, 1994 (2 pages).

U.S. Appl. No. 10/884,794 to Douady et al., entitled "System and Method for Communicating Between Modules", filed Jul. 2, 2004.

U.S. Appl. No. 10/892,815 to Douady et al., entitled "Device and Method for Forwarding a Message", filed Jul. 16, 2004.

U.S. Appl. No. 11/039,112 to Douady et al., entitled "Method and System for Transmitting Messages in an Interconnection Network", filed Jan. 19, 2005.

U.S. Appl. No. 11/054,179 to Douady et al., entitled "Method and Device for Switching Between Agents", filed Feb. 9, 2005.

U.S. Appl. No. 10/988,831 to Douady et al., entitled "System and Method for Transmitting a Sequence of Messages in an Interconnection Network", filed Nov. 15, 2004.

* cited by examiner

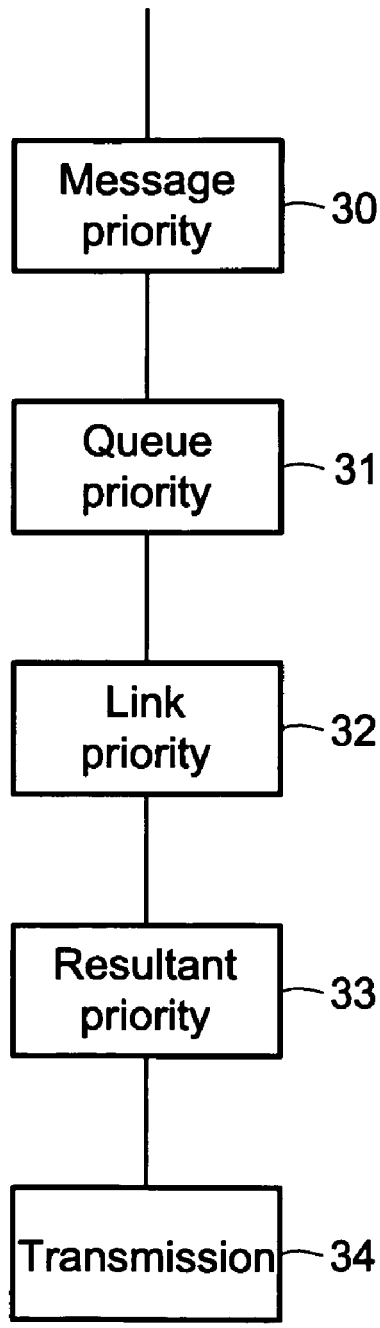

METHOD AND DEVICE FOR MANAGING PRIORITY DURING THE TRANSMISSION OF A MESSAGE

BACKGROUND OF THE INVENTION

1. Field of the Invention

The present invention relates to a method and a device for managing priority during the transmission of a message in an interconnections network.

2. Description of the Relevant Art

Interconnections networks ensure transmission of messages between various agents or entities of a communication network. A transmission may be made without performing message processing, or while performing message processing. In all cases one speaks of transmission of messages. Processing of a message is understood to mean for example an analysis of data contained in the message, or an appending of data to the message.

A message is, of course, a string of computer data, that is to say a string of bits or bytes. Each message includes a message header which chiefly includes the destination address of the message and the size of the message.

These interconnections networks are generally composed of two distinct parts which interact, namely a hardware part including physical links and a network controller, hard-wired or microprogrammed, which executes a low-level protocol, and a software part for effecting the interface with software functions of higher level.

An ideal interconnections network would certainly be a fully interconnected network, that is to say a network in which each pair of agents is coupled by a point-to-point link. However, this is unrealistic onwards of a few tens of agents. It is therefore necessary for the interconnections network to be able to cater for all the communications between agents with a limited number of links per agent.

Specialized agents exist for performing routing or transmission of messages flowing over the interconnections network.

These interconnections networks include transmission devices or routers (also known as "switches"), an organization of the network ensuring the link between the routers and the other agents, and a routing assembly, which caters for the flow of messages within the organization of the network.

A router is an active agent of the interconnections network which receives as input messages coming from one or more agents and which forwards or routes each of these messages respectively to their destination agent or to another router. This routing is performed by means of the address of the message destination agent, which is present in the header of the message to be routed.

The organization of a network constitutes the physical structure linking the various nodes or points of connections of an interconnections network.

The routing assembly manages the way in which a message is routed, or forwarded, from a source agent dispatching the message to a message destination agent through routers, along a routing path.

Any agent present in an interconnections network can dispatch and/or receive messages. The routing technique determines the way in which the messages are transmitted from the dispatching agent, which creates the message, to the destination agent. For a given interconnections network, there are various routing techniques, for which the main objectives are to reduce the end of message latency, or end of message forwarding time, for a message, from the dispatching agent to the destination agent, to increase the overall throughput and to improve the overall reliability of the network. The latency includes all the waiting times due to the way in which the messages propagate in the network and more particularly through the devices for transmitting messages in charge of routing the messages. The throughput is the quantity of computer data that a link of the network can transport per unit time, and can be measured locally over a link of the interconnections network or globally over the whole of the interconnections network. The reliability of a network is important, since the probability of errors grows rapidly with the number of nodes in an interconnections network.

A transmission agent includes at least one input including a means of storage organized as a message queue of the first in first out or FIFO type and at least one output including a message transmission means able to decide on the message to be transmitted. Only the first messages of the queues of the inputs are, of course, visible to the transmission agent.

Routing methods taking account of priorities between messages exist. The document present on the site brocade.com from the company Brocade, entitled "Providing reliable, high speed operations in large SANs" and the document present on the site cva.stanford.edu entitled "Virtual Channel, Flit Reservation Flow Control and Deadlock" talk of a procedure consisting in assigning priorities to messages during their creation, and in ordering the messages of a message queue of an input of a transmission agent according to their priority.

This modification of the order of the messages has a high hardware and software cost. Moreover, certain applications do not support the feature of messages not arriving in the order in which they were created, like certain real-time applications, for example display or audio or video retransmission applications.

SUMMARY OF THE INVENTION

In view of the foregoing, a system and method is herein described for performing a routing, which takes account of the priorities of the messages, at lesser cost, and which substantially improves the management of the throughput in the network.

Thus, there is proposed a method of managing priority during the transmission of a message, in an interconnections network including at least one transmission agent which includes at least one input and at least one output, each input including a means of storage of a queue of messages of type first in first out. A message priority is assigned during the creation of the message and a queue priority equal to the maximum of the priorities of the messages of the queue is assigned to at least one queue of messages of an input. A link priority is assigned to a link linking an output of a first transmission agent to an input of a second transmission agent, equal to the maximum of the priorities of the queues of messages of the inputs of said first agent including a first message destined for that output of said first agent which is coupled to said link, and the priority of the link is transmitted to that input of said second agent which is coupled to the link.

It is thus possible to take account of the high priority of a message, by assigning virtually, to the messages which precede it in its queue of messages, said message's priority which is higher than those of said messages which precede it. It is thus possible to manage priorities at low cost, and without having to modify the order of the messages of the queue, since certain applications do not support the receiving of messages in a modified order.

In an embodiment, the message, destined for said output, of a queue having the highest queue priority is furthermore transmitted on said output of the transmission agent.

In an advantageous mode of implementation, a resultant priority equal to the maximum of the priority of the link and of the priority of the queue of messages of the input to which the link is coupled is assigned, furthermore, to the queue of the messages of the input of said second agent on which said link arrives.

Furthermore, a link priority is furthermore assigned to a link coupled to an output of the second transmission agent, being a resultant priority, equal to the maximum of resultant priorities which result from the priorities of the queues of messages and the priorities of the respective links of said queues of messages of the inputs of said second agent including a first message destined for said output of said second agent.

Stated otherwise, a link priority is assigned to a link linking an output of a first transmission agent, which is equal to the maximum of the resultant priorities of the queues of messages of the inputs of said first agent including a first message destined for said output of the first agent which is coupled to said link. The resultant priority of a queue of an input of an agent being defined as the maximum of the priorities of the messages constituting the queue and of the priority of the link coupled to said queue of messages.

In an advantageous mode of implementation, the message, destined for an output of a queue having the highest resultant priority is furthermore transmitted on said output of the first transmission agent.

In an embodiment, the priority assigned to a message created by an agent is managed dynamically as a function of the throughput of response to the messages dispatched by said agent, so as to optimize the use of the communication throughput available.

According to the invention, there is also proposed a system for managing priority during the transmission of a message, in an interconnections network including at least one transmission agent which includes at least one input and at least one output, each input including a means of storage organized as a queue of messages of type first in first out. The message creation system agents include means for assigning a message priority transmitted with the message. Furthermore, at least one queue of messages of an input includes means for assigning a queue priority equal to the maximum of the priorities of the messages of the queue to the queue of messages. The system includes means for assigning a link priority to a link linking an output of a first transmission agent to an input of a second transmission agent, equal to the maximum of the priorities of the queues of messages of the inputs of said first agent including a first message destined for the output of said first agent which is coupled to said link, and means for transmitting the priority of the link to the input of said second agent which is coupled to the link.

In an embodiment, an output of said transmission agent includes means for transmitting the message, destined for said output, of a queue having the highest queue priority.

Furthermore, the system includes means for assigning a link priority to a link coupled to an output of the second agent, being a resultant priority, equal to the maximum of resultant priorities which result from the priorities of queues of messages and the priorities of the respective links of said queues of messages of the inputs of said second agent including a first message destined for said output of said second agent.

In an embodiment, an output of said agent includes means for transmitting the message, destined for said output, of a queue having the highest resultant priority.

In an advantageous embodiment, the system includes means for assigning to the queue of the messages of that input of said second agent on which said link arrives, a resultant priority equal to the maximum of the priority of the link and of the priority of the queue of messages of the input to which the link is coupled.

In an embodiment, the system includes means for transmitting a link priority being a resultant priority.

In a first example, the means of transmission include point-to-point linkups each associated with a link for transmitting messages.

In a second example, said means of transmission are able to transmit one of said priorities in a dedicated message.

BRIEF DESCRIPTION OF THE DRAWINGS

Other aims, characteristics and advantages of the invention will become apparent on reading the following description, given by way of non-limiting example, and offered with reference to the appended drawings in which:

FIG. 3 illustrates the steps of a method according to the invention implemented by a device according to FIG. 2.

Figure 1:
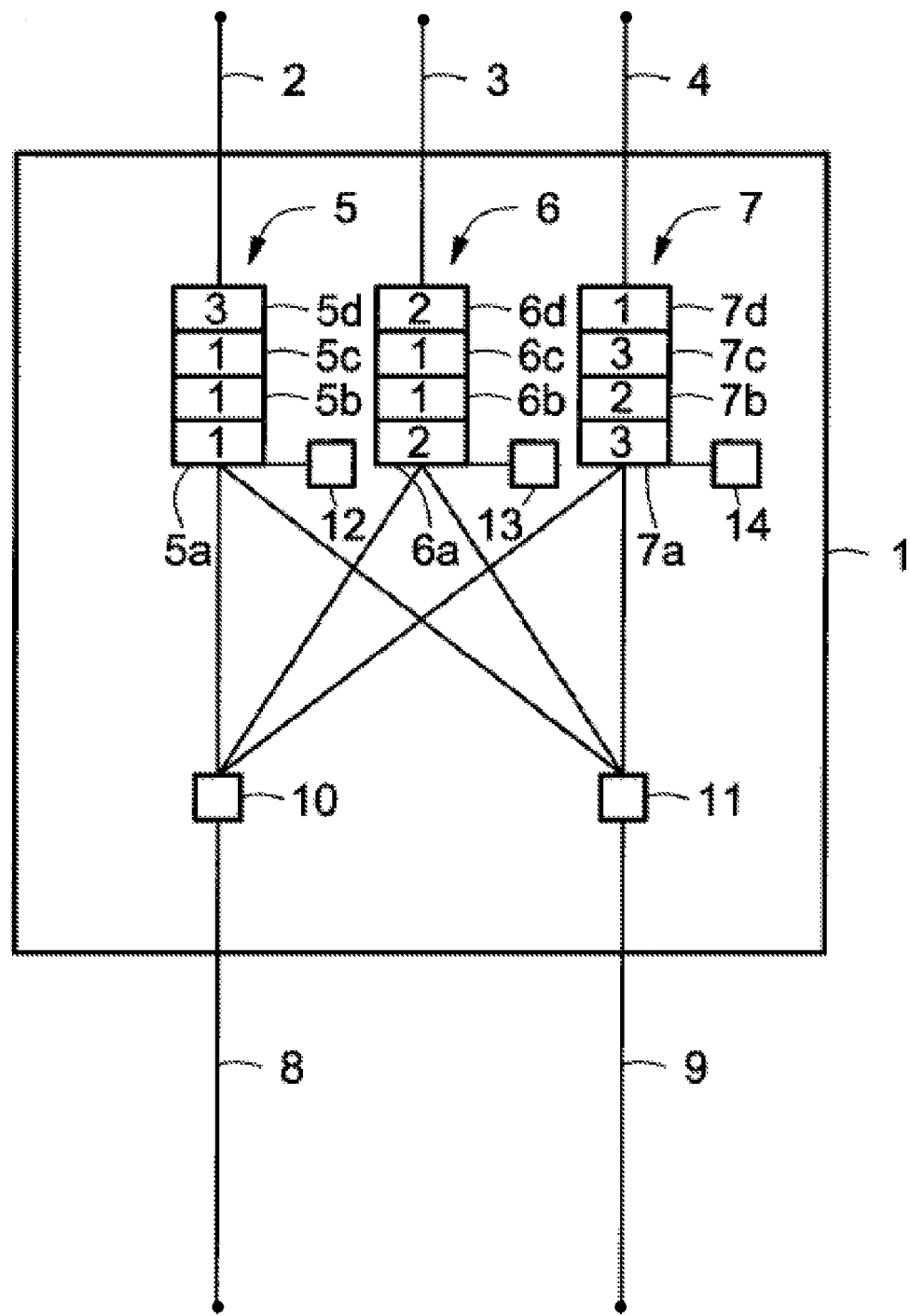
FIG. 1 is a schematic diagram of a first embodiment of a system according to the invention.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, an agent for transmitting messages 1 includes three inputs 2, 3 and 4 each respectively having a storage module organized as a queue of messages 5, 6 and 7. The number of inputs of the transmission agent 1 can obviously be arbitrary. The transmission agent 1 may either transmit a message as is, or perform a processing between their receipt and their dispatch.

The transmission agent 1 includes two outputs 8 and 9, each respectively including a transmission module 10, 11 able to choose the message to be transmitted on the respective output 8 and 9. The number of outputs of the agent 1 can, of course, be different. The outputs 8 and 9 of the transmission agent 1 are linked to all the queues of messages 5, 6, and 7. A transmission module 10 and 11 has access to the first message of a queue of messages 5, 6, and 7. The queues of messages 5, 6, and 7 respectively include modules 12, 13 and 14 for assigning a queue priority equal to the maximum of the priorities of the messages of the said queue 5, 6 and 7 to their respective queue of messages 5, 6 and 7. This may, for example, be performed by using a set of counters, each dedicated to a message priority level and to a queue of messages 5, 6 and 7, each indicating, at any instant, the number of messages of the corresponding priority level that are present in the queue 5, 6 and 7.

An example of the operation of such a device will now be described with reference to FIG. 1. Accordingly, represented here are for example message queues 5, 6 and 7 each including four messages, with three priority levels, with values 1, 2 and 3. These priorities have been assigned to the messages during their creation. The message queue 5 is at this instant composed of a first message 5a of priority 1, of a second message 5*b* of priority 1, of a third message 5*c* of priority 1, and of a fourth message 5*d* of priority 3. The message queue 6 is, for its part, composed of a first message 6*a* of priority 2, of a second message 6*b* of priority 1, of a third message 6*c* of priority 1, and of a fourth message 6*d* of priority 2. Finally, the message queue 7 is composed of a first message 7*a* of priority 3, of a second message 7*b* of priority 2, of a third message 7*c* of priority 3, and of a fourth message 7*d* of priority 1.

The module 12 assigns a queue priority to the message queue 5. This priority is equal to the maximum of the priorities of the messages of the queue, in this instance 3, which is the value of the priority of message 5*d*. Likewise, the module 13 assigns, to the message queue 6, a queue priority of value 2, which is the value of the messages 6*a* and 6*d*. The module 14 assigns, to the message queue 7, a queue priority of value 3, which is the value of the messages 7*a* and 7*c*.

An example will be set forth in which the first message 5*a* of queue 5 is destined for the output 8, the first message 6*a* of queue 6 is destined for the output 8, and the first message 7*a* of queue 7 is destined for the output 9.

The transmission module 10 of the output 8, compares the queue priorities of the message queues whose first message is destined for the output 8. In this instance, in this example, it compares only the queue priorities of queues 5 and 6. The priority of queue 5 having a value equal to 3, and the priority of queue 6 having a value equal to 2, the transmission module 10 will transmit the first message 5*a* of queue 5 on the output 8.

For the outputs of transmission agents, the selection of the message to be transferred by priority will be performed in the manner just described.

If several queues destined for one and the same output of a transmission agent have one and the same queue priority, then the choice of the queue whose first message will be transmitted will be made by known methods, for example by chance draw.

This method therefore makes it possible, when a message of high priority arrives at a message queue of an input of a transmission agent, to simulate a temporary assignment of its priority to the messages of the queue which precede it, and as it were to push the messages ahead so as to force the passage of this high-priority message.

Figure 2:
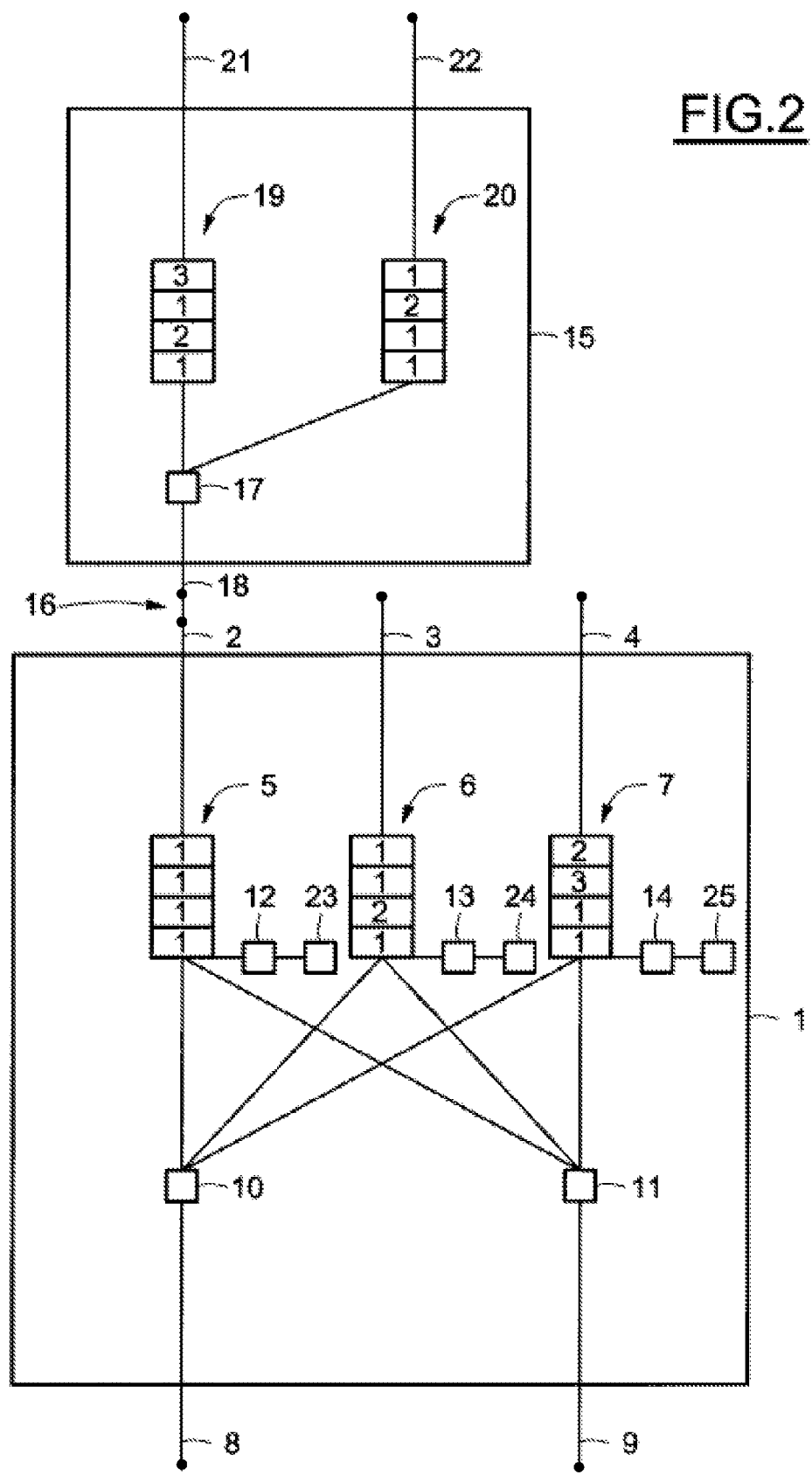
FIG. 2 is a schematic diagram of a second embodiment of a system according to the invention.

FIG. 2 is a schematic diagram of a second embodiment of a system with an extra priority level. In the example described, the references that are common with those of FIG. 1 retain identical numbering. Account is taken moreover of a transmission agent 15, linked to an input of the transmission agent 1, here the input 2, by a link 16. A transmission module 17 of an output 18, assigns a link priority to the link 16, equal to the maximum of the priorities of the message queues 19 and 20 of the inputs 21 and 22 of the agent 15 which include a first message destined for the output 18 coupled to the said link 16. The module 17 transmits the link priority to the message queue 5 of the input 2. The modules 12, 13 and 14 assign a queue priority to their respective queue 5, 6 and 7. Modules 23, 24 and 25 respectively assign a resultant priority to their queue 5, 6 and 7.

In the example illustrated by FIG. 2, the module 17 assigns a link priority equal to 3 to the link 16. This link priority has the value 3, since the queue priority of the queue 19 equals 3, the queue priority of queue 20 equals 2, and here, the first message of queue 19 and the first message of queue 20 are destined for the output 18. The link priority of the link 16 being equal to the maximum of these two values, it equals 3.

The modules 12, 13 and 14 respectively calculate queue priorities equal to 1, 2 and 3 for the queues 5, 6 and 7. The modules 23, 24 and 25 respectively assign resultant priorities to the queues 5, 6 and 7. In this example, the resultant priorities of queues 6 and 7 are their queue priorities, namely 2 and 3 respectively, and only the first message of queue 5 and the first message of queue 6 are destined for the output 8. The module 23 will take account of the link priority of the link 16, which equals 3, by assigning a resultant priority of 3, equal to the maximum of the queue priority of queue 5, which equals 1, and of the priority of link 16, which equals 3. The transmission module 10 then assigns the maximum priority, from the resultant priorities of the message queues 5 and 6, the first message of queue 7 not being destined for the output 8 associated with the module 10, and transmits the corresponding message on the output 8. This maximum priority, equal to 3, therefore takes account of the messages present in message queues of agents situated upstream. The transmission module 10 of the output 8 assigns to the link coupled to the output 8, equal to the maximum of the resultant priorities of the message queues 5 and 6 of the inputs 2 and 3 of the agent 1 which include a first message destined for the output 8.

Of course, everything described in this example applies to any number of agents.

Stated otherwise, a priority is propagated between an agent initiating a message and a destination agent for the message, so as to push the messages which precede a message having a higher priority.

Just as before, if for an output, several queues, whose first message is destined for the output, have one and the same resultant priority value, then a known method for deciding between them is used, for example chance draw.

The transmission of the various priorities used in the applications described above may be performed, for example, by means of extra point-to-point connections, dedicated to the transmission of these priorities, or by including these priorities in specific dedicated messages.

FIG. 3 describes the steps of a method according to the invention, implemented by a device according to FIG. 2.

Firstly, during the creation of a message by an agent of the interconnections network, this message is assigned a priority (step 30). In the examples cited, three levels of priority 1, 2 and 3 are taken. Of course, everything remains valid regardless of the number of priority levels, this number generally being less than or equal to 8.

For a transmission agent 1 belonging to the interconnections network, for the message queues 5, 6 and 7 of the inputs of the agent 1, a queue priority equal to the maximum of the priorities of the messages of the queue of each input is calculated (step 31).

For an input 2 of the agent 1, coupled to an output 18 of an upstream agent 15, a link priority is assigned, equal to the maximum of the queue priorities of the message queues 19 and 20, the first message of whose queue is destined for the said output 18 (step 32). If account has to be taken of a link priority of an agent upstream of the agent 15, it will be done as described hereinafter in the case of the agent 1.

A resultant priority is determined for a message queue 5, 6 and 7 of an input 2, 3 and 4, equal to the maximum of the queue priority of the queue in question and of the link priority of the link coupled to the input (step 33).

Finally, the first message of the queue, destined for the said output, the queue of which has the resultant priority equal to the maximum of the resultant priorities is transmitted for an output (step 34). If several queues have one and the same maximum resultant priority value, one queue out of these queues will be chosen by means of a known method, for example chance draw.

This method and system makes it possible to take account at low cost of the priority of a message in an interconnections circuit, by propagating the priorities through the agents present in the interconnections network.

This method and system furthermore makes it possible to optimize the use of the overall throughput of an interconnections network.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. A method of managing priority during the transmission of a message in an interconnections network, the interconnections network comprising at least one transmission agent which comprises a plurality of inputs and at least one output, each input comprising a means of storage of a queue of messages of type first in first out, the method comprising:
    assigning a message priority during the creation of the message, the message priority being unchanged during the transmission of the message;
    assigning a queue priority equal to the maximum of the priorities of the messages of the queue to the queue of messages of an input;
    assigning a link priority to a link linking an output of a first transmission agent to an input of a second transmission agent, the link priority being equal to the maximum of the queue priorities of the queues of messages coupled to the inputs of said first transmission agent, the queues of messages coupled to the first transmission agent comprising a first message destined for that output of said first agent which is coupled to said link;
    calculating a resultant priority equal to a maximum of the link priority of the link and of the queue priority of the queue of messages of the input to which the link is coupled; and
    assigning the resultant priority to the queue of the second agent which is coupled to the link.

2. The method according to claim 1, wherein the message, destined for said output, of a queue having the highest queue priority is furthermore transmitted on said output of the transmission agent.

3. The method according to claim 1, wherein a link priority is furthermore assigned to a link coupled to an output of the second transmission agent, being a resultant priority, equal to the maximum of resultant priorities which result from the priorities of the queues of messages and the priorities of the respective links of said queues of messages of the inputs of said second agent comprising a first message destined for said output of said second agent.

4. The method according to claim 1, wherein the priority assigned to a message created by an agent is managed dynamically as a function of the throughput of response to the messages dispatched by said agent, so as to optimize the use of the communication throughput available.

5. A system for managing priority during the transmission of a message in an interconnections network, the system comprising at least one transmission agent which comprises a plurality of inputs and at least one output, each input comprising a means of storage organized as a queue of messages of type first in first out, wherein:
    the message creation agents comprise means for assigning a message priority transmitted with the message, the message priority being unchanged during the transmission of the message; and
    at least one queue of messages of an input comprises means for assigning a queue priority equal to the maximum of the priorities of the messages of the queue to the queue of messages;
the system further comprising:
    means for assigning a link priority to a link linking an output of a first transmission agent to an input of a second transmission agent, the link priority being equal to the maximum of the queue priorities of the queues of messages coupled to the inputs of said first transmission agent, the queues of messages coupled to the first transmission agent comprising a first message destined for the output of said first agent which is coupled to said link; and
    means for assigning a resultant priority to the queue of the second agent which is coupled to the link, the resultant priority being based upon the link priority of said link as assigned by the first transmission agent.

6. The system according to claim 5, wherein an output of said transmission agent comprises means for transmitting the message, destined for said output, of a queue having the highest queue priority.

7. The system according to claim 6, comprising means for assigning a link priority to a link coupled to an output of the second agent, being a resultant priority, equal to the maximum of resultant priorities which result from the priorities of queues of messages and the priorities of the respective links of said queues of messages of the inputs of said second agent comprising a first message destined for said output of said second agent.

8. The system according to claim 6, wherein an output of said second agent comprises means for transmitting the message, destined for said output, of a queue having the highest resultant priority.

9. The system according to claim 8, furthermore comprising means for assigning to the queue of the messages of the input of said second agent on which said link arrives, a resultant priority equal to the maximum of the priority of the link and of the priority of the queue of messages of the input to which the link is coupled.

10. The system according to claim 9, comprising means for transmitting a link priority being a resultant priority.

11. The system according to claim 10, wherein said means of transmission comprise point-to-point linkups each associated with a link for transmitting messages.

12. The system according to claim 10, wherein said means of transmission are able to transmit one of said priorities in a dedicated message.

13. The system according to claim 7, wherein an output of said second agent comprises means for transmitting the message, destined for said output, of a queue having the highest resultant priority.

* * * * *